US012108903B2

(12) United States Patent
Grendelmeier

(10) Patent No.: US 12,108,903 B2
(45) Date of Patent: Oct. 8, 2024

(54) APPARATUS FOR PREPARING FOODSTUFFS WITH STEAM

(71) Applicant: Carogusto AG, Amriswil (CH)

(72) Inventor: Thomas Grendelmeier, Hombrechtikon (CH)

(73) Assignee: Carogusto AG, Amriswil (CH)

( * ) Notice: Subject to any disclaimer, the term of this patent is extended or adjusted under 35 U.S.C. 154(b) by 335 days.

(21) Appl. No.: 16/768,833

(22) PCT Filed: Nov. 26, 2018

(86) PCT No.: PCT/EP2018/082485
§ 371 (c)(1),
(2) Date: Jun. 1, 2020

(87) PCT Pub. No.: WO2019/110340
PCT Pub. Date: Jun. 13, 2019

(65) Prior Publication Data
US 2021/0145200 A1      May 20, 2021

(30) Foreign Application Priority Data
Dec. 4, 2017   (DE) .................... 10 2017 128 767.1

(51) Int. Cl.
A47J 27/04     (2006.01)
B08B 3/02      (2006.01)
F16L 21/00     (2006.01)

(52) U.S. Cl.
CPC ................ *A47J 27/04* (2013.01); *B08B 3/02* (2013.01); *F16L 21/005* (2013.01); *A47J 2027/043* (2013.01)

(58) Field of Classification Search
CPC ...... A47J 27/04; A47J 2027/043; A47J 27/16; B08B 3/02; F16L 21/005; F24C 15/003
See application file for complete search history.

(56) References Cited

U.S. PATENT DOCUMENTS

| 4,775,074 A | * | 10/1988 | Ershig .................... B65D 45/28 220/323 |
| 5,442,997 A | | 8/1995 | Branz et al. |
| 2016/0238262 A1 | | 8/2016 | Aynur et al. |

FOREIGN PATENT DOCUMENTS

| CN | 202544044 U | * 11/2012 | .............. E03C 1/23 |
| CN | 202554044 U | 11/2012 | |

(Continued)

OTHER PUBLICATIONS

Machine translation of DE 102015221005 A1 performed on May 9, 2022, Mederer (Year: 2017).*

(Continued)

*Primary Examiner* — Dana Ross
*Assistant Examiner* — Kevin Guanhua Wen
(74) *Attorney, Agent, or Firm* — Bachman & LaPointe, P.C.

(57) ABSTRACT

An apparatus (1) for preparing foodstuffs accommodated in a vessel, the apparatus includes a steam-generating unit for generating steam, a steam-feeding unit connected to the steam-generating unit in a steam-conducting manner via a steam-supply line and having a steam probe containing at least one steam-discharging opening, and further includes a drive unit for adjusting the steam-feeding unit in translatory fashion, relative to a rinsing device (2) arranged beneath the steam-feeding unit and having a rinsing tray (3) and a rinse-water-application unit or spray nozzle (18), for rinsing the steam probe following foodstuff-preparation, wherein the rinsing tray (3) is connected to an outflow-line portion (13) for discharging dirty rinse water, wherein, on the rinsing tray (3), a drain funnel (10), which can be released from the rinsing tray (3) without any tools, for cleaning and/or changeover purposes and is sealed in relation to the rinsing tray (3), is secured to the outflow-line portion (13).

21 Claims, 2 Drawing Sheets

(56) References Cited

FOREIGN PATENT DOCUMENTS

| | | | | |
|---|---|---|---|---|
| CN | 103458744 A1 | * | 12/2013 | ............... A47J 27/04 |
| CN | 106623206 A1 | * | 5/2017 | ............ B08B 13/00 |
| CN | 206655283 U | | 11/2017 | |
| DE | 102010029796 A1 | * | 12/2011 | ............ H05K 5/0213 |
| DE | 102012202318 B4 | | 5/2015 | |
| DE | 102015221005 A1 | * | 4/2017 | ............... A47J 27/04 |
| JP | H5-87066 U | | 11/1993 | |
| JP | 2001200563 A | * | 7/2001 | ............... E03C 1/22 |
| JP | 2003070644 A | | 3/2003 | |
| JP | 2004505700 A | | 2/2004 | |
| JP | 2010121382 A | * | 6/2010 | ............... E03C 1/28 |
| JP | 2011516762 A1 | * | 5/2011 | ............... A03C 1/20 |
| JP | 3204494 U | | 6/2016 | |
| SU | 803849 A3 | | 2/1981 | |
| WO | WO 2000029203 A1 | * | 5/2000 | ............ B29C 69/00 |
| WO | 2015/157152 A1 | | 10/2015 | |
| WO | WO 2016126156 A1 | * | 8/2016 | ............ B65D 47/20 |

OTHER PUBLICATIONS

Machine translation of CN 202544044 U performed on May 9, 2022, Lin (Year: 2012).*
Machine translation of CN 103458744 A1 performed on May 10, 2022, Li et al. (Year: 2013).*
Machine translation of JP 2011516762 A1 performed on May 10, 2022, Coronado et al. (Year: 2011).*
Machine translation of CN 106623206 A1 performed on May 10, 2022, Zhu et al. (Year: 2017).*
Machine translation of WO 2000029203 A1 performed on Oct. 5, 2022, Voss (Year: 2000).*
Machine translation of DE 102010029796 A1 performed on Oct. 5, 2022, Aligner et al. (Year: 2011).*
Machine translation of JP 2010121382 A performed on Dec. 4, 2023, Nishisaka et al. (Year: 2010).*
Machine translation of JP 2001200563 A performed on Dec. 4, 2023, Horie (Year: 2001).*
International search report for patent application No. PCT/EP2018/082485 dated Feb. 4, 2019.

* cited by examiner

APPARATUS FOR PREPARING FOODSTUFFS WITH STEAM

BACKGROUND OF THE INVENTION

The invention relates to a device for preparing foods received in a vessel, in particular ready meals, (using steam), the device comprising a steam generator unit for generating unit, a steam delivery unit having a steam probe containing at least one steam discharge opening, the steam delivery unit being connected to the steam generator unit in a steam-conducting manner via a steam feed line, and drive means, for the, translational, displacement of the steam delivery unit relative to a rinsing device, preferably disposed below the steam delivery unit along the vertical, having a rinsing tank and rinsing water application means, in particular comprising a rinsing nozzle for rinsing, in particular spraying, the steam probe after a food preparation process (using rinsing water), the rinsing tank being in fluid communication with a drain line section for discharging dirty rinsing water.

From DE 10 2015 221 005 1, a device for preparing foods received in a vessel using steam is known in which a steam delivery unit, to which steam is supplied by means of a steam generator unit, can be displaced in a translational manner relative to a rinsing device in the vertical direction. The rinsing device comprises a tubed rinsing tank which is mounted from above on a work surface. The rigid drain line which is in fluid communication with the rinsing tank may be blocked when the known device is operated; a laborious dismantling of the fixed tubing may be required in order to clear the blockage.

DE 10 2012 202 318 B4 also discloses a food preparation device which has a tubed rinsing tank.

SUMMARY OF THE INVENTION

Starting from the aforementioned state of the art, the object of the invention is to indicate a device for preparing foods received in a vessel which can be cleaned in a facilitated manner. Preferably, the device or its rinsing device can be mounted in a simple manner or without great effort.

Said object is attained by a device as disclosed herein, i.e., concerning a generic device, by the fact that a drain funnel is fixed to the drain line section, wherein the drain funnel can be detached from a rinsing tank, in particular without any tools being required, for cleaning and/or exchange purposes and is sealed in relation to the rinsing tank by sealing means. The drain line section can be realized in one piece, in particular in a monolithic manner, with the drain funnel or as a separate component which is fixed to the drain funnel.

Advantageous embodiments of the invention are disclosed in the dependent claims.

The idea of the invention is to provide a drain funnel in the bottom area of the rinsing tank via which dirty rinsing water can flow towards the drain line section which is realized in one piece with the drain funnel or which is preferably fixed to drain funnel on the outlet side through a discharge opening of the drain funnel. According to the invention, the drain funnel is fixed so as to be detachable to or in the rinsing tank in order be able to remove the drain funnel from the rinsing tank, in particular without any tools being required, for cleaning and/or exchange purposes of the drain funnel and/or of the drain line section. In order to avoid a leakage of rinsing water in an area between the drain funnel and the rinsing tank in a reliable manner, sealing means are provided which are disposed so as to be detachable at the rinsing tank and/or the drain funnel and which preferably also have the fixing function for realizing the detachable connection between the rinsing tank and the drain funnel, as will be explained below. If the drain or the drain line section is blocked in practice, the drain funnel and the drain line section connected or fixed thereto can be detached from the rinsing tank in a simple manner without any tools being required and the drain funnel can be cleaned. In this way, it is also possible to exchange the drain funnel and/or the drain line section in a simple manner in the case of wear. In a particularly preferred embodiment which will be described in detail below, the drain line section has a free end which leads to a siphon or a collecting vessel, for example, and which is, in particular loosely, inserted or protrudes into the siphon or the collecting vessel to not have to separate the drain line section from a counterpart, in particular a pipe sleeve or a similar drain line connection before the drain funnel and the drain line section are removed. The drain funnel is the drain of the rinsing tank and is preferably inserted so as to be detachable into a mounting opening on the bottom side of the rinsing tank, in particular from above, i.e. from the direction of an upper rinsing tank opening.

As mentioned above, the sealing means for sealing the detachable connection between the drain funnel and the rinsing tank are particularly preferably realized as, in particular sole, fixing means for the, in particular form-fitting and/or clamping and/or locking, support of the drain funnel. In other words, a particularly preferred embodiment provides to realize a detachable fixed (and obviously sealed) connection between the rinsing tank and the drain funnel via the sealing means. To this end, the sealing means are particularly preferably fixed, at least sectionwise, to the rinsing tank and/or the drain funnel, in particular by a realization in one piece, for example in the multicomponent injection molding process. In an exemplary manner, a form-fitting connection can be realized by the fact that the sealing means realize a circumferential groove in the area of the mounting opening in the rinsing tank and/or at the drain funnel on the opposite side, a corresponding circumferential bead of the opposite component in the radial direction engaging into said circumferential groove in a force-fitting, in particular locking and/or clamping manner, or vice versa.

As indicated above, it is particularly useful if the rinsing tank is realized as a multicomponent plastic part, particularly preferably a multicomponent injection-molded part. The multicomponent rinsing tank comprises an elastomer material which, at least sectionwise, realizes the sealing means and a rigid plastic material compared to the elastomer material which realizes, in particular, the tank form and/or a mounting plate section form which is preferably provided and which will be described below. In addition to the sealing means functionality for the sealed connection of the drain funnel to the rinsing tank, the elastomer material which is fixed to the rinsing tank within the scope of a multicomponent injection-molded process can also realize additional functional sections (described below) of the rinsing tank and can limit a residual steam drain line opening or realize a sealing in relation to a work surface, for example.

The detachable connection between the drain funnel and the rinsing tank is particularly preferably realized in such a manner that the drain funnel can be removed from the rinsing tank by applying a detachment force in the direction of the steam delivery unit which is disposed above the drain funnel, i.e. upwards along the vertical. In other words, the drain funnel is preferably inserted into a lower mounting opening or a mounting opening which is disposed in the area of the rinsing tank bottom in such a manner that the funnel can be removed from the mounting opening, preferably by a force in the direction of an upper rinsing tank opening, preferably within the scope of a purely translational movement, in particular while overcoming a corresponding holding force, preferably realized by the sealing means. Of course, it is also possible to realize a fixing or a detachment by a rotational movement, for example by realizing a thread connection—however, a detachment by applying a pull and/or push force in the vertical direction is preferred. The mounting can preferably be realized in a simple manner by applying a fixing force which is opposite to the aforementioned linear detachment force, the drain funnel being pressed, preferably axially, against a stop or an abutment at the rinsing tank.

In a particularly useful embodiment of the device, the drain line section is not realized in a rigid manner, but as a flexible drain hose, preferably fixed so as to be detachable to the drain funnel. With respect to the selection of the hose material, different possibilities are available. It is conceivable, for example, to realize the hose as a plastic hose, in particular a corrugated hose, or as an extruded, substantially smooth hose, in particular having an inner fabric for increasing the strength. The drain hose is particularly preferably realized in a robust manner as a metal fabric hose or metal corrugated hose.

As indicated above, the drain line section, in particular a free end of the drain hose which faces away from the drain funnel, is loosely inserted into a siphon opening and/or loosely into a collecting vessel, in particular a collecting vessel of the device which is particularly preferably disposed in an area below a work surface to be described below in order to allow for a removal of the drain line section, in particular of the drain hose together with the drain funnel, in particular without any tools being required, without having to remove the drain line section from a counterpart, such as a pipe sleeve or clamp. Of course, it is also possible to realize a fixed, sealed mounting of the drain line section at the counterpart, in particular at a drain pipe and/or siphon.

In a preferred embodiment, the rinsing tank is surrounded by a plate-shaped or flat mounting plate section which is particularly preferably realized in one piece (monolithically) with the rinsing tank, in particular in the injection molding process. Alternatively, the mounting plate section can be realized by a separate mounting plate which is preferably made of plastic and which is preferably connected to the rinsing tank, in particular an edge of the rinsing tank, for example by screwing.

It is particularly useful if the mounting plate section is disposed below a work surface or if the work surface rests on the mounting plate section and the rinsing tank can be accessed through a work surface opening, i.e. from above in the vertical direction. An upper circumferential edge of the rinsing tank can extend through the work surface opening and/or is flush with an upper work surface of the work surface opening. It is also conceivable to dispose the entire rinsing tank below the upper side of the work surface. In order to avoid a moisture penetration into an area above the mounting plate section, i.e. in an area between the work surface and the mounting plate section, the mounting plate section and/or the rinsing tank is/are preferably sealed by an elastomer seal, in particular in relation to a bottom side of the work surface and/or in relation to a circumferential edge of the work surface opening in the radial direction. It is particularly useful if it is an integral elastomer seal of the mounting plate section and/or of the rinsing tank which is preferably realized together with the mounting plate section and/or the rinsing tank in the injection molding process.

In a particularly useful embodiment of the device, a support section, preferably made of plastic, for the steam delivery unit is realized at the mounting plate section, the support section being preferably spaced apart from an upper rinsing tank opening in the radial direction and/or realized by (or, alternatively, fixed to) the mounting plate section, the steam delivery unit resting on said support section in a lower rinsing position. A corresponding opening in the work surface is preferably assigned to the support section, said opening being preferably spaced apart from the work plate opening which is assigned to the rinsing tank. The support section extends preferably through said opening upwards in the vertical direction.

In an additional or alternative advantageous embodiment of the invention, an opening is realized in the mounting plate section, the opening being preferably spaced apart from an upper rinsing tank opening in the radial direction and/or limited by an elastomer material, particularly preferably realized or injected within the scope of a multicomponent injection molding process, a residual steam drain line being received in said opening. Such an embodiment can preferably be realized in the multicomponent injection molding process and increases the functionality of the assembly, comprising the mounting plate section and the rinsing tank.

In a particularly preferred embodiment, a rinsing nozzle mounting opening is realized in the rinsing tank, a rinsing nozzle for applying a rinsing water spray jet to the steam probe being disposed in the rinsing nozzle mounting opening.

BRIEF DESCRIPTION OF THE DRAWINGS

Further advantages, features and details of the invention can be derived from the following description of preferred exemplary embodiments and from the drawings.

In the following.

In the figures, the same elements and elements having the same function are referenced with the same reference numerals.

DETAILED DESCRIPTION

Figure 1:
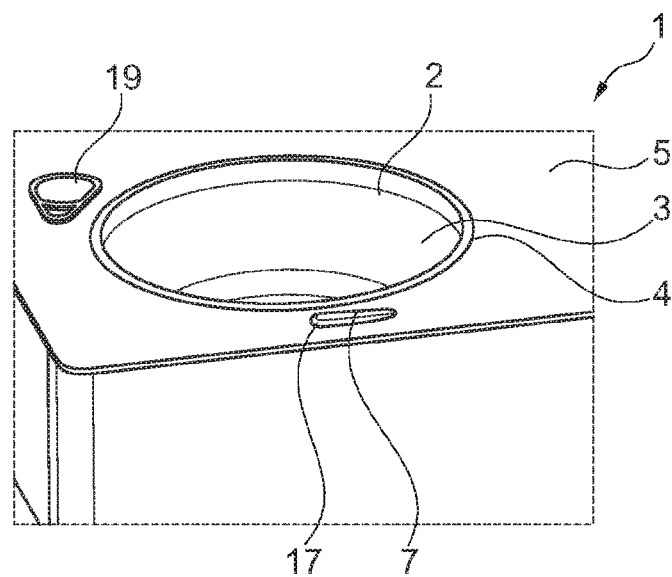
FIG. 1 is a sectional view of a device for preparing foods received in a vessel, comprising a steam generator unit which can be displaced in the vertical direction and a shown rinsing tank, integrated into a work surface.

In FIG. 1, a sectional view of a device 1 for preparing foods received in a vessel, in particular ready meals, is shown. More specifically, FIG. 1 shows a rinsing device 2 which has a rinsing tank 3 which can be accessed through a work surface opening 4 from above in the vertical direction. Work surface opening 4 is located in a work surface 5 which has a horizontal orientation and which is made of stainless steel, for example.

A steam generator unit of the device for generating steam and a steam delivery unit which is connected to the steam generator unit in a steam-conducting manner via a steam feed line are not shown, wherein the steam delivery unit can be realized as described in DE 10 2015 221 005 A1, for example, and shown in the figures, in particular FIG. 1, of said disclosure. The steam delivery unit can be displaced by means of corresponding drive means in a translational manner along a vertical axis relative to a vessel in which foods are received, the vessel being located in an area above rinsing tank 3 shown in FIG. 1, in particular supported by a support carriage which can be displaced in the horizontal direction, in order to prepare or heat the foods. The steam delivery unit preferably comprises a cover for covering the vessel in a sealed manner in order to define a steam chamber. The steam is applied to the foods via a steam probe as shown in DE 10 2015 221 005 A1, for example—the steam probe is preferably realized and disposed or driven in order to steam and mix the foods at the same time in order to cause an improved thermal energy distribution.

Figure 2:
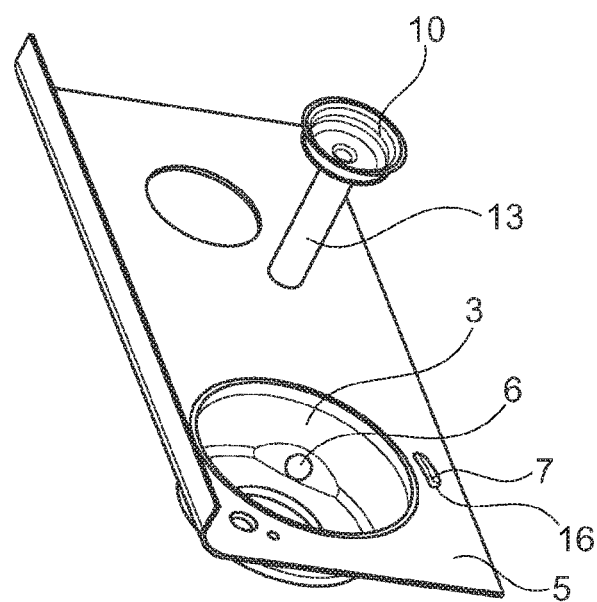
FIG. 2 is a perspective representation of the rinsing tank according to FIG. 1 and a drain funnel which can be inserted so as to be detachable into said rinsing tank, a drain line section realized as a flexible hose being fixed to the drain funnel.

Rinsing water application means, in particular comprising a rinsing nozzle, are not shown, wherein said rinsing nozzle can be inserted or mounted into a rinsing nozzle opening 6 in rinsing tank 3 shown in FIG. 2.

After one or several preparation processes, the steam generator unit can be displaced downwards along the vertical, in particular until the steam probe protrudes into shown rinsing tank 3, rinsing tank 3 being closed by an aforementioned cover of the steam delivery unit. The steam delivery unit is supported by a support section 7 in the aforementioned (lower) rinsing position, said support section 7 being realized in a monolithic manner with rinsing tank 3 at a mounting plate section 8 shown in FIG. 3, mounting plate section 8 being realized in one piece with rinsing tank 3. Alternatively, mounting plate section 8 (and thus support section 7) is a component which is separate from and fixed to rinsing tank 3. Aforementioned mounting plate section 8 (irrespective of whether said mounting plate section 8 is realized in one piece with or separate from rinsing tank 3) is disposed below work surface 5—i.e. work surface 5 rests on mounting plate section 8 in the mounted state. The combination of mounting plate section 8 and rinsing tank 3 is sealed in relation to work surface 5, more specifically in relation to a bottom side of work surface 5 by means of an annular elastomer seal 9 which is injected upon mounting plate section 8 and/or rinsing tank 3 in the two component injection molding process, for example.

Figure 3:
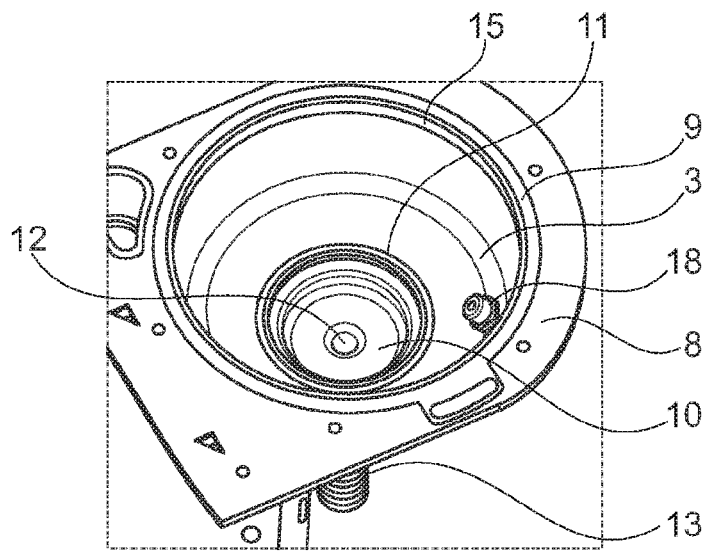
FIG. 3 is a representation of the rinsing tank without a work surface, the rinsing tank being surrounded by a mounting plate section realized in a monolithic manner with said rinsing tank.
Figure 4:
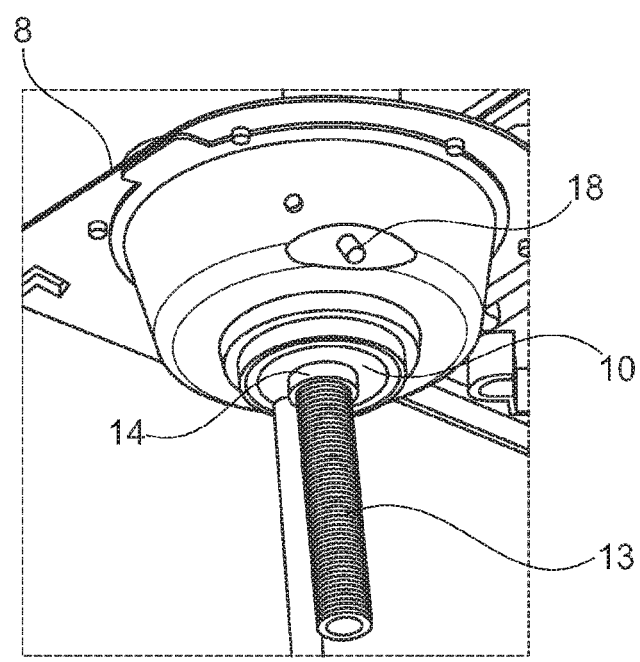
FIG. 4 is a representation of the rinsing tank and the mounting plate section in a view from below.

FIG. 3 shows that a drain funnel 10 is located at the bottom of rinsing tank 3, drain funnel 10 being sealed in relation to rinsing tank 3 via sealing means 11. Drain funnel 10 has a central drain opening 12 which leads to a drain line section 13 which is realized as a corrugated hose and which is fixed to drain funnel 10, more specifically an extension of drain funnel 10, in the present case by means of a fixing clamp 14.

The flexible drain hose or drain line section 13 can be removed together with drain funnel 10 from rinsing tank 3 without any tools being required—all that is needed is to apply a detachment force to drain funnel 10, the detachment force being oriented towards an upper rinsing tank opening 15 in the vertical direction.

In the shown exemplary embodiment, drain funnel 10 is retained in the fixing position shown in FIG. 3 by means of sealing means 11. Said sealing means 11 are realized in one piece with rinsing tank 3 within the scope of the two component injection molding process and have an annular groove in which a corresponding circumferential bead of drain funnel 10 is received.

In FIG. 2, drain funnel 10 and drain line section 13 realized as a flexible hose are shown in the dismantled state.

As mentioned above, support section 7 is realized at mounting plate section 8. Said support section 7 extends through an opening 16 assigned thereto in work surface 5, in fact at a radial distance to rinsing tank 3. The sealing for the purpose of avoiding a water ingress into an area between mounting plate section 8 and the bottom side of work plate 5 is realized via an elastomer seal 17 which surrounds support section 7 and which is realized in one piece with mounting plate section 8, preferably within the scope of the two component injection molding process.

As mentioned above, rinsing nozzle opening 6 is located in rinsing tank 3 (cf. FIG. 2); in the representation according to FIG. 3, a rinsing nozzle 18 of the rinsing water application means is mounted in said rinsing nozzle opening 6.

An (additional) opening 19 is provided in mounting plate section 8 at a radial distance to rinsing tank 3, opening 19 being surrounded by elastomer material and being used for receiving a residual steam drain line.

A corresponding or aligned opening in work surface 5 is assigned to opening 19.

REFERENCE SIGNS

1 device
2 rinsing device
3 rinsing tank
4 work surface opening
5 work surface
6 rinsing nozzle opening
7 support section
8 mounting plate section
9 elastomer seal
10 drain funnel
11 sealing means
12 drain opening
13 drain line section
14 fixing clamp
15 upper rinsing tank opening
16 opening in work surface
17 elastomer seal
18 rinsing nozzle
19 opening in mounting plate section

The invention claimed is:

1. A device (1) for preparing foods received in a vessel, comprising a steam generator unit for generating steam, a steam delivery unit having a steam probe containing at least one steam discharge opening, the steam delivery unit being connected to the steam generator unit in a steam-conducting manner via a steam feed line, and drive means for the displacement of the steam delivery unit relative to a rinsing device (2), wherein the rinsing device comprises:

a rinsing tank (3) and rinsing water application means for rinsing the steam probe after a food preparation process, the rinsing tank (3) comprising a body formed of a first material and defining a tank drain opening, and further comprising a sealing means (11) formed from a second material and extending radially inwardly from the tank drain opening and defining a drain funnel opening, wherein the sealing means is formed of a second material, wherein the body and the sealing means are a singular multicomponent injection molded component, wherein the second material is an elastomer and the first material is rigid relative to the second material; and a drain funnel (10) fixed to a drain line section (13), wherein the drain funnel (10) can be detached from and engaged with the sealing means (11) of the rinsing tank (3) for cleaning and/or exchange purposes and is sealed in relation to the rinsing tank (3) by the sealing means (11).

2. The device according to claim 1, wherein the sealing means (11) comprise fixing means for form-fitting and/or clamping and/or locking support of the drain funnel (10).

3. The device according to claim 1, wherein the drain funnel (10) is inserted into the drain funnel opening and is fixed to and detachable from the rinsing tank (3) in such a manner that the drain funnel (10) can be removed from the rinsing tank (3) by applying a detachment force along a vertical direction.

4. The device according to claim 1, wherein the drain line section (13) comprises a flexible drain hose, fixed so as to be detachable to the drain funnel (10).

5. The device according to claim 1, wherein the drain line section (13) is fixed to a siphon, or loosely inserted into said siphon, or leads to a collecting vessel of the device (1) in a loose manner.

6. The device according to claim 1, wherein the rinsing tank (3) has an upper outer periphery and the upper outer periphery is surrounded by a plate-shaped mounting plate section (8).

7. The device according to claim 6, further comprising a work surface (5) resting on the mounting plate section (8), the work surface (5) having a work surface opening (4) such that the rinsing tank (3) can be accessed through the work surface opening (4), the mounting plate section (8) and/or the rinsing tank (3) being sealed in relation to a bottom side of the work surface and/or in relation to an edge of the work surface opening in a radial direction by an elastomer seal.

8. The device according to claim 6, wherein the mounting plate section (8) comprises a support section (7) for the steam delivery unit, the steam delivery unit resting on said support section (7) in a lower rinsing position.

9. The device according to claim 1, wherein the mounting plate section (8) comprises an opening, a residual steam drain line being received in said opening.

10. The device according to claim 1, wherein the rinsing tank (3) further comprises a rinsing nozzle mounting opening and a rinsing nozzle (18) in the rinsing nozzle mounting opening for applying a rinsing water spray jet to the steam probe being disposed in the rinsing nozzle mounting opening.

11. The device according to claim 1, wherein the prepared foods are ready meals.

12. The device according to claim 1, wherein the drive means comprises drive means for translational displacement of the steam delivery unit relative to the rinsing device (2), disposed below the steam delivery unit along the vertical.

13. The device according to claim 1, wherein the rinsing water application means comprises a rinsing nozzle (18).

14. The device according to claim 1, wherein the drain funnel (10) can be detached from the rinsing tank (3) without any tools being required.

15. The device according to claim 6, wherein the plate-shaped mounting plate section (8) is one piece with the rinsing tank (3).

16. The device according to claim 7, wherein the elastomer seal is defined in one piece at the mounting plate section (8) and/or the rinsing tank (3).

17. The device according to claim 8, wherein the support section (7) is made of plastic and is radially spaced apart from an upper rinsing tank opening (15) in the rinsing tank (3).

18. The device according to claim 9, wherein the opening is radially spaced apart from an upper rinsing tank opening (15) in the rinsing tank (3).

19. The device according to claim 9, further comprising an integral, elastomer material in the opening.

20. The device according to claim 1, wherein the seal means extends radially inwardly from a radially inner edge of the drain opening.

21. The device according to claim 1, the sealing means defines an annular groove, and a circumferential bead on the drain funnel (10) enters the annular groove to hold the drain funnel (10) in place.

* * * * *